United States Patent [19]

Sugimoto

[11] Patent Number: 4,478,120
[45] Date of Patent: Oct. 23, 1984

[54] METAL-SAWING MACHINE

[75] Inventor: Tadahiro Sugimoto, Amagasakishi, Japan

[73] Assignee: Daito Seiki Company Limited, Osaka, Japan

[21] Appl. No.: 441,271

[22] Filed: Nov. 12, 1982

[51] Int. Cl.³ .............................................. B23D 53/04
[52] U.S. Cl. .......................................... 83/71; 83/644; 83/789; 83/796; 83/809
[58] Field of Search .................... 83/71, 789, 800, 811, 83/812, 791, 794, 796, 642, 644, 809

[56] References Cited

U.S. PATENT DOCUMENTS 3,077,132  2/1963  Whitmore ........................... 83/794 X
4,127,045  11/1978  Blucher et al. ..................... 83/801 X

FOREIGN PATENT DOCUMENTS 2330023  1/1974  Fed. Rep. of Germany ........ 83/794
107729   7/1982  Japan ................................. 83/789
163020   10/1982  Japan ................................. 83/789

Primary Examiner—Frank T. Yost
Attorney, Agent, or Firm—Koda and Androlia

[57] ABSTRACT

A metal-sawing machine includes a rocking system whereby the saw blade is enabled to rock in a cutting plane in which the work is cut, wherein the rocking motion is controlled so as to conform to the cutting stroke, which is determined in accordance with the shape and size of the work. The machine ensures that the rocking motion of the saw blade fully participates in cutting the work unlike the known metal-sawing machines in which the rocking motion is partially wasted in cutting "air".

5 Claims, 14 Drawing Figures

FIG.9
INSTRUCTION FOR MOVING THE CAM PLATE TO THE RIGHT —MAGNETIZING OF SOLENOID "E"—
INSTRUCTION FOR MOVING THE CAM PLATE TO THE LEFT —MAGNETIZATION OF SOLENOID "F"—
INSTRUCTION FOR DESCENDING THE GUIDE FRAME —MAGNETIZING OF SOLENOID "G"—
POSITION OF THE GUIDE FRAME

METAL-SAWING MACHINE

BACKGROUND OF THE INVENTION

The present invention relates to a metal-sawing machine, and more particularly, to a metal-sawing machine including a saw-blade rocking system whereby the saw blade is enabled to rock in a plane along which the work is cut, wherein the rocking motion of the saw blade is controlled so as to conform to the cutting stroke without excess or deficiency, irrespective of the cross-sectional shape and size of the work. The saw blade is enabled to pass through the work by following a most desired arch-like cutting trace.

The inventor has made improvements on the known metal-sawing machines, particularly about the rocking system. In the new type of metal-sawing machine the saw carrier is constructed so as to enable the saw blade to rock in a plane along which the saw blade is passed through the work, thereby ensuring that the path of the saw blade through the work is made arch-like. The arch-like cutting trace is known to be most desired for the metal sawing, because the cutting drag exerting on the saw blade is considerably reduced owing to the reduced contact of the blade with the work. In addition, the saw blade is effectively prevented from slipping off on the work, which leads to a shortened cutting time.

In the prior invention, however, the rocking range is fixed irrespective of the shape and size of the work, whereas the cutting strokes are varied particularly when the work has a circular cross-section, where the cutting stroke gradually becomes large toward the middle portion of the work and becomes small toward the terminating end. As a result most of the arch-like cutting trace followed by the saw blade is ineffective, in that the saw blade cuts only "air". It is when the cutting stroke conforms to or falls within the rocking range that the work efficiently is cut by the saw blade following arch-like traces, where no waste occurs in the movement of the saw blade.

Another disadvantage of the prior rocking system is attributed to the structure in which the saw blade is descended at a gradual constant speed against the work while it is in a rocking motion. This causes uneven cutting amounts at each rocking stage. The varied cutting amounts mean varied resistances between the saw blade and the work. To overcome the varied resistance so as to enable the saw blade to drive into the work equally, an excessive amount of force is likely to impart to the saw blade, which shortens the life of the blade.

OBJECTS AND SUMMARY OF THE INVENTION

The present invention aims at solving the problems pointed out with respect to the known saw-blade rocking system, and has for its object to provide an improved metal-sawing machine including a saw-blade rocking system whereby the saw blade is given a reciprocating motion such that the cutting point is reciprocally shifted along the desired cutting trace, from one end of the work to the other without excess or deficiency, thereby securing an efficient cutting operation.

Another object of the present invention is to provide an improved metal-sawing machine including a saw-blade rocking system whereby the cutting point on the work is shifted in accordance with the shape and size of the work, and the height of the guide frame or the saw carrier. The height of the guide frame or the saw carrier can be measured at any selected point; for example, it can be marked from the supports thereof or any selected point on the saw carrier per se, which changes in height with time.

A further object of the present invention is to provide an improved metal-sawing machine including a saw-blade rocking system whereby the saw blade is enabled to make kerfs of a constant depth throughout the cutting strokes by the constant amount, thereby equalizing the cutting resistance throughout the cutting strokes.

Other objects and advantages of the present invention will become more apparent from the following description when taken in connection with the accompanying drawings, which show, for the purpose of illustration only, an embodiment of the metal-sawing machine of the invention.

According to one advantageous aspect of the present invention, there is provided a metal-sawing machine including a first means for measuring a rocking amplitude, a second means for measuring the height of the saw carrier, an input means for inputting the shape and dimension of the work, and an arithmetic means for calculating the turning points of the saw blade in its reciprocal movement, thereby ensuring that the rocking range is accorded to the shape and size of the work so as not to waste the movement of the saw blade.

BRIEF EXPLANATION OF THE DRAWINGS

FIG. 9 is a timing diagram showing the sequence of operation of the rocking system in FIG. 1.

DETAILED DESCRIPTION OF THE INVENTION

Figure 1A:
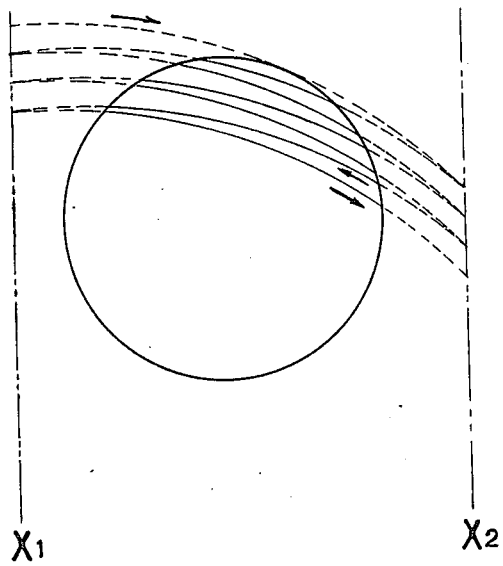
FIGS. 1 (a), (b) are diagrammatic views showing the shifting of the cutting point of the saw blade on a cylindrical and rectangular work under the prior art rocking system.
Figure 1B:
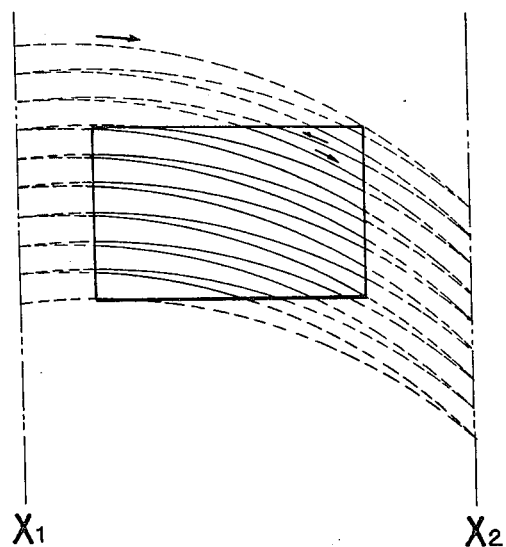

In order to explain the background of the present invention, reference will be more particularly made to a typical example of a saw-blade rocking system known in the art, shown in FIG. 1. As referred to above, this represents cutting traces under the prior art rocking system. The lines $X_1$, $X_2$ define the maximum limits for allowing the saw blade to rock therein, commonly called a rocking range. As evident from FIG. 1, the saw blade does not touch the work in the range indicated by the dotted lines, in which the saw blade only cuts "air", not the work. In the known rocking system the rocking range is fixed irrespective of the shape and size of the work, and accordingly, a large part of rocking motion of the saw blade is wasted by cutting "air". The arch-like cutting traces per se ensures an efficient cutting performance, but as shown in FIG. 1, the motion of the saw blade is greatly wasted. This trades off the advantage of the arch-like cutting traces.

Figure 2A:
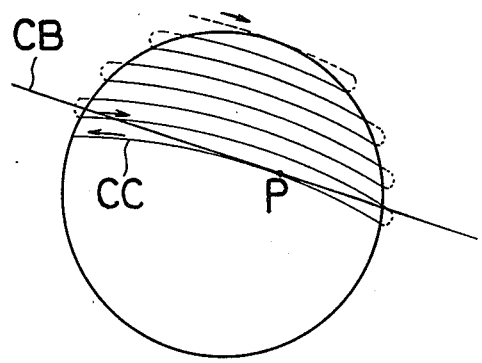
FIGS. 2 (a), (b) are diagrammatic views showing the shifting of the cutting point under the rocking system of the present invention.
Figure 2B:
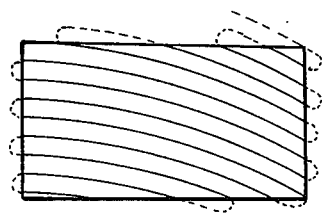

Under the present invention the rocking range is limited within the cutting stroke which is defined by the shape and size of the work. In FIG. 2 the cutting traces are indicated by the curves CC, and the saw blade is by SB. The letter P indicates a cutting point on the work, which is shifted along the cutting traces without either excess or deficiency. This means that the cutting point turns at each end of the cutting traces as shown in FIGS. 2 (a), (b). It also should be noted that the cutting point is shifted substantially at the constant speed throughout the cutting traces.

Figure 3:
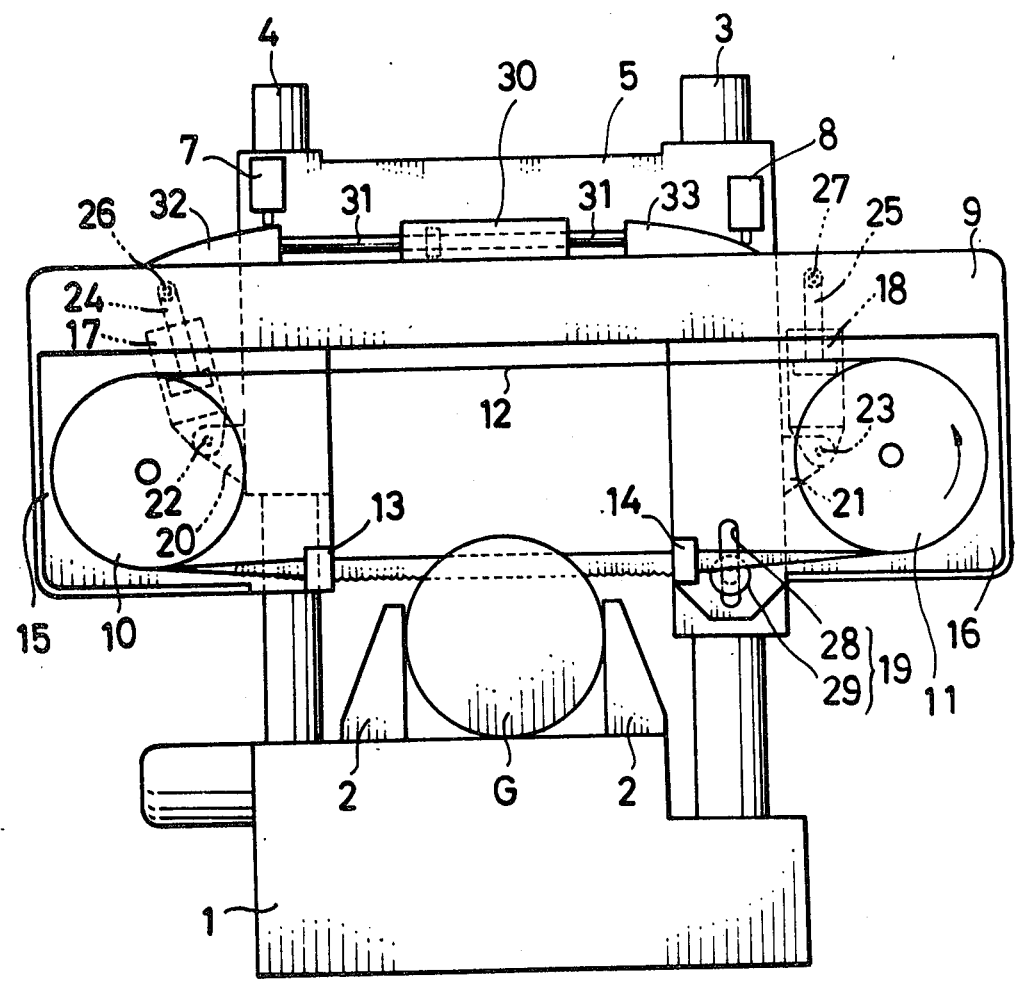
FIG. 3 is a front view of a metal-sawing machine embodying the present invention.
Figure 4:
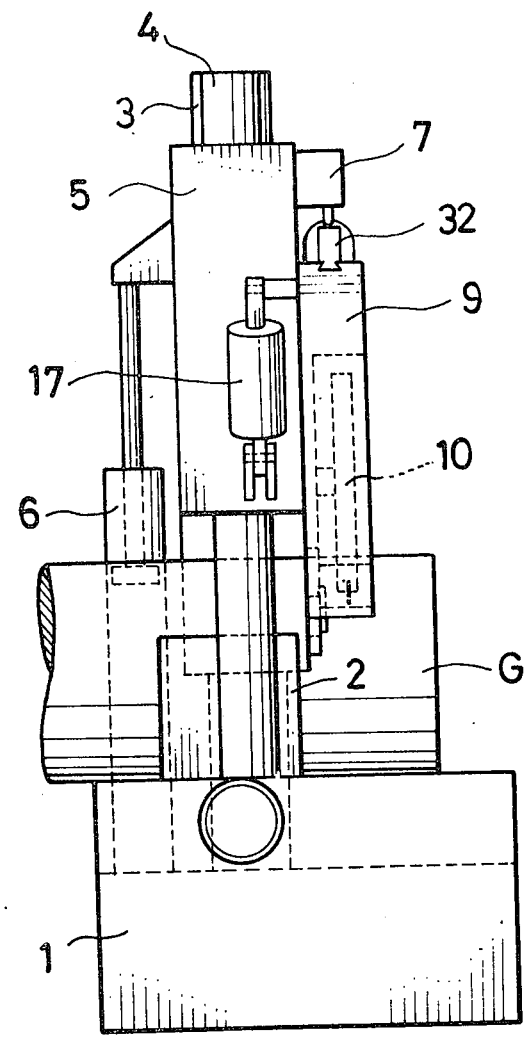
FIG. 4 is a side view of the metal-sawing machine of FIG. 3.

Referring now to FIGS. 3 and 4, the mechanical structure of a metal-sawing machine of the invention will be explained:

A vise having a pair of jaws 2 is mounted on a bed 1 to hold a work (G). Two columns 3 and 4 are uprightly supported on the bed 1, wherein the column 3 will be referred to as the main column while the column 4 as the subordinate column. A guide frame 5 is carried on the columns 3 and 4, such that it can be vertically moved by means of a hydraulic feed cylinder 6. The guide frame 5 is provided with two servo-valves 7 and 8, whose feelers 83 project downwards. A saw carrier 9 includes a pair of saw wheels 10 and 11, on which an endless saw blade 12 is carried with saw guides 13 and 14 interposed. The saw guides 13 and 14 are adapted to allow the blade edge to become upright with respect to the work (G) so as to cut a kerf therein.

The saw carrier 9 is carried on the guide frame 5 through servo-cylinders 17 and 18 and a guide unit 19, such that the saw carrier can rock like a see-saw under the interaction of these members 17, 18 and 19. The servo-cylinder 17 is carried on a bracket 20 fastened to the guide frame 5 through a pivot 22, and the piston rod 24 thereof is fastened to the saw carrier 9 through a pivot 26. Likewise, the servo-cylidner 18 is carried on the guide frame 5 and the saw carrier 9 through pivots 23 and 27, wherein the reference numerals 21 and 25 designate a bracket and a piston rod, respectively. The guide unit 19 consists of a slot 28 vertically produced in the saw carrier 9 and a projection 29 upright on the guide frame 5, wherein the projection 29 is engaged in the slot to constitute a unitary construction. The guide unit 19 is located on the line of cutting action of the saw blade 12 or in its neighborhood.

The saw carrier 9 is provided with an oblique plate carrier 30, which includes a pilot cylinder, piston rods 31, and oblique plates 32 and 33. The oblique plate 32 is engaged with the servo-valve 7, and the oblique plate 33 is engaged with the servo-valve 8. These oblique plates have symmetrically shaped slant faces which keep contact with the servo-valves 7 and 8. In a preferred ambodiment each oblique plate has a gradual slope for its slant face as clearly shown in FIG. 7. The height and curve of the slant face is decided by previously calculating on the desired arch-like trace to be followed by the saw blade with respect to the work, which means that the saw blade can be caused to follow the ideal layout trace.

Figure 7:
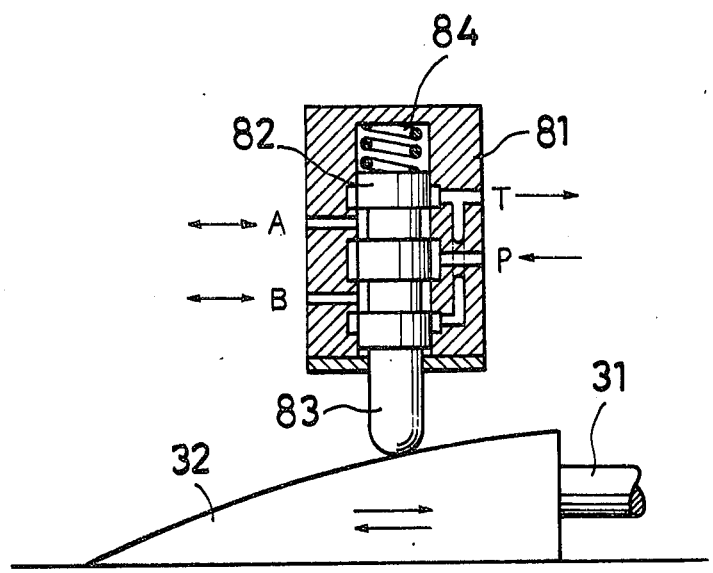
FIG. 7 is a cross-sectional view on an enlarged scale of a servo-valve, particularly showing a relationship thereof with the oblique plate.

FIG. 7 shows the relationship between the servo-valve and the oblique plate, in which the internal structure of the servo-valve is clearly shown.

Each servo-valve includes a valve body 81, a spool 82 slidable in the valve body, the spool including the feeler 83 at its terminating end, and a coil spring 84 located at the back of the spool. In addition, the valve is provided with four ports P, T, A and B. The port P receives oil from a pump 71, and the port T allows the oil in the valve body to discharge therethrough to a reservoir 72. The ports A and B open and close in accordance with the position of the spool 82 in the valve body. When the spool is displaced downwards from its state of equilibrium shown in FIG. 8, the oil is fed from the port P to the port A and the port B allows the oil to return to the reservoir 72. When the spool is upwardly displaced, the oil is fed from the port P to the port B, and the port A allows the oil to return to the reservoir 72. The spool is provided with ring-shaped recesses through which the ports P, T, A and B communicate with each other.

Figure 6:
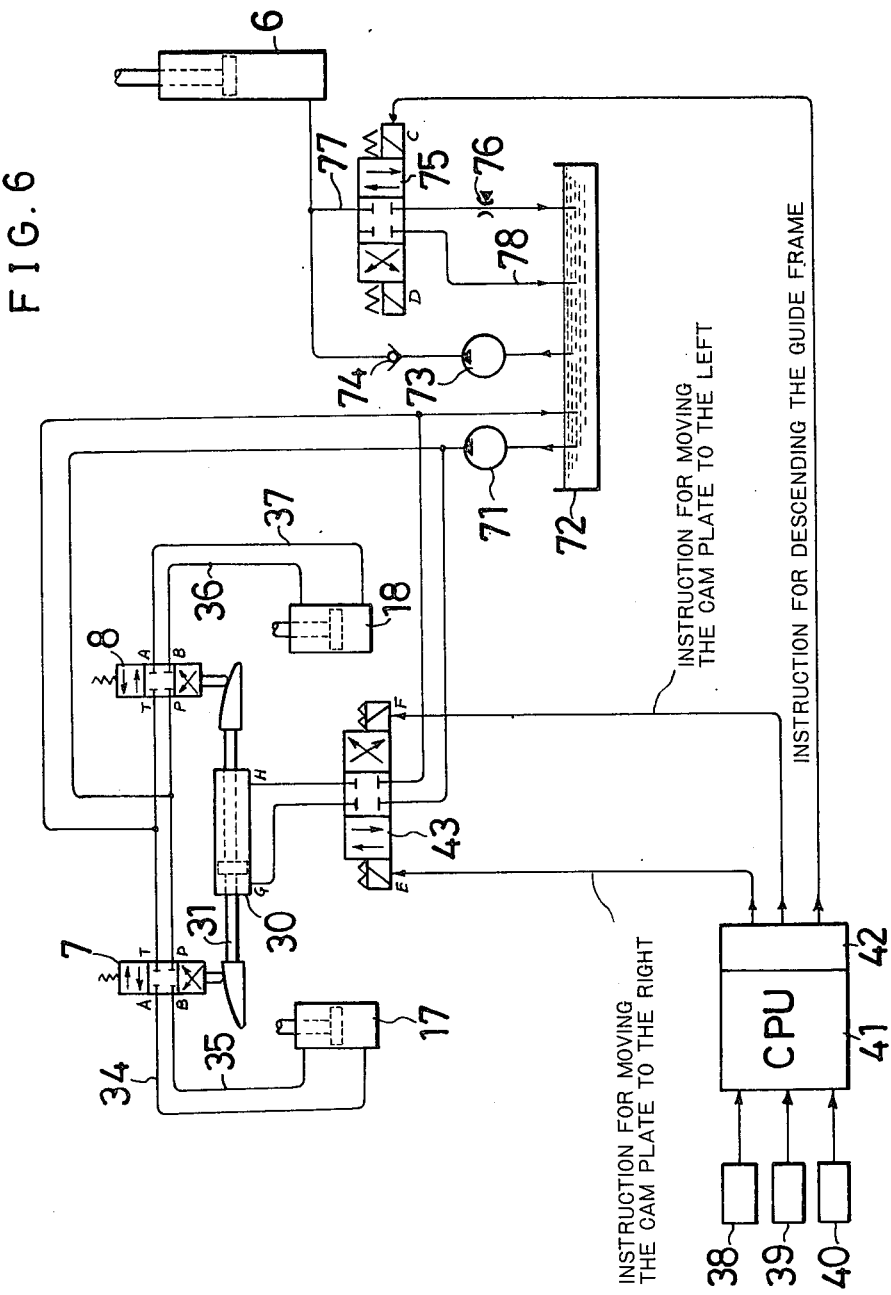
FIG. 6 is a hydraulic flow diagram and an electric diagram.

The left-hand servo-valve 7 controls the left-hand servo-cylinder 17, and the right-hand servo-valve 8 controls the right-hand servo-cylinder 18 under the hydraulic action as shown in FIG. 6. The port A of the servo-valve 7 communicates with the servo-cylinder 17 by means of a hose 34 connected to the lower section of the servo-cylinder and the port B communicates with the servo-cylinder 17 by means of a hose 35 connected to the upper section thereof. The right-hand servo-valve 8 communicates with the servo-cylinder 18 by means of hoses 36 and 37 in the same manner as described with respect to the left-hand servo-valve 7.

Referring to FIG. 6 the pilot cylinder 30 is actuated to the left and right by controlling a directional valve 43. This directional over valve 43 is a magnetic 4-port, 3-position change-over valve including two solenoids E, F. When the solenoid E is magnetized, the oil line for the pump 71 is communnicated with the left-hand port G, thereby causing the piston rod 31 to move to the right. When the solenoid F is energized, the oil line for the pump 71 is communicated with the right-hand port H, thereby causing the piston rod to move to the left.

The hydraulic feed cylinder 6 is upwardly actuated by a pump 73 through a check valve 74, and when it is descended, the oil in the cylinder 6 is drawn through a directional valve 75 and a flow-control valve 76. The directional valve 75 is a magnetic 3-port, 3-position change-over valve including two solenoids C, D. When the solenoid C is energized, a discharge line 77 for the hydraulic cylinder 6 is communicated with the flow-control valve 76. When the solenoid D is energized, the discharge line 77 is communicated with another discharge line 78, which provided independently of the flow-control valve 76. When neither of the solenoids C, D is energized, the directional valve 75 is in the neutral position, thereby causing no discharge of oil.

Referring again to FIG. 6 how the rocking system is electrically controlled will be explained:

A guide frame position detector 38 is provided so as to detect the heights of the guide frame 5 and convert into digital signals, thereby detecting the heights of the saw carrier. A oblique plate position detector 39 is adapted to detect the positions of the piston rod 31 and feed back in analogue or in digit, thereby detecting the rocking amplitude of the saw carrier. In addition, a keyboard 40 is provided so as to allow the cross-sectional shape and size of the work to be input thereto. The signals from these elements 38, 39 and 40 are transmitted to a microprocessor 41 controls the directional valve 43, 75 through an output interface 42.

A desired set of program is written in the arithmetic section and the ROM. Reference is made between the stored program and the data freshly input thereto about the cross-sectional shape (and size) of the work and the measured values of the heights of the guide frame 5, thereby calculating the points of return of the cutting strokes in accordance with the shape (and size) of the work. When a signal for indicating the positions of the piston rod 31 is in accord with the signal for designating the turning point of the saw blade, the solenoid C for the directional valve 75 is magnetized for a fixed period of time thereby to draw the oil in the hydraulic feed cylinder 6, whereby the saw carrier 5 is descended by the fixed amount. At this stage the oblique plate 32 is moved to the left or to the right, accordingly.

Figure 8:
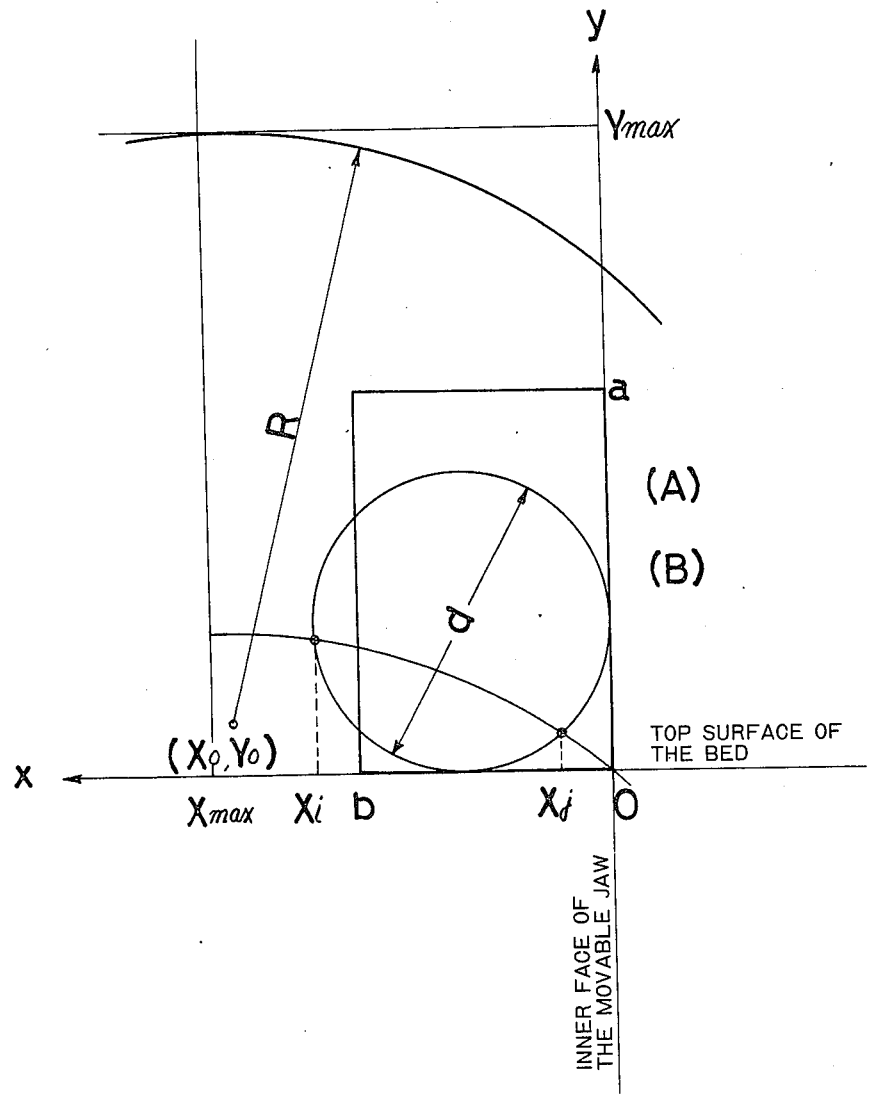
FIG. 8 is an explanatory diagram showing the control of the turning points of the saw blade in its rocking motion.

The turning points can be visually obtained in the coordinates. One example is shown in FIG. 8:

The inner face of the fixed jaw of the vise is placed at the origin 0 of the X-axis (X=0), whereas the top face of the bed 1 is placed at the origin 0 of the Y-axis (Y=0). The expanding movement of the movable jaw is represented by positive numbers in the X-axis, and the heights taken by the saw blade above the bed 1 are represented by positive numbers in the Y-axis. In this way the upper limit Xmax in the X-coordinates is determined by the moving range of the movable jaw, and the Ymax in the Y-coordinates is determined by the highest position taken by the saw blade.

The curve of cutting trace along which the saw blade cuts the work is determined by the shape of the oblique plates 32, 33 and the rocking pattern by the following equation:

$$(x - X_o)^2 + (y - Y_o)^2 = R^2 (0 < x < X_{max}) \quad (1)$$

$X_o$ and $R$ are constant, whereas $Y_o$ is variable in accordance with the positions of the guide frame, which are transmitted in signals.

If a cross-sectional shape of the work is represented by (a×b) as shown (A) in FIG. 8, the following equation is established with respect to the upper line of the work:

$$y = a \ldots \quad (2)$$

This value is input through the keyboard, and by solving the linear equations (1) and (2), the X-coordinates for the left-hand turning point in the upper line of the work is determined, wherein the X-coordinates increases from (X=0) up to (X=b). After X becomes equal to b, the left-hand turning point subsequent thereto remains at b for the X-coordinates.

The X-coordinates for the right-hand turning point continues to be (X=0) up to the lower limit, which is represented by the following equation with respect to the lower line of the work:

$$y = 0 \ldots \quad (3)$$

By solving the linear equations (1) and (3), the X-coordinates for the right-hand turning point in the lower line of the work is determined.

If a cross-sectional shaped of the work is circular with d in diameter as shown in FIG. 8 (B), the circle is represented by the following equation:

$$\left(x - \frac{d}{2}\right)^2 + \left(y - \frac{d}{2}\right)^2 = \frac{d^2}{4} \quad (4)$$

By solving the linear equations (1) and (4) the X-coordinates $X_i$ for the left-hand turning point and the $X_i$ for the right-hand turning point can be determined. The signals for the X-coordinates can be substituted by the signals from an oblique plate position detector 39.

Referring to FIG. 3, now suppose that the piston rod 31 of the pilot cylinder 30 is forced rightwards from the position shown in the drawing. Then the point of contact between the servo-valve 7 and the oblique plate 32 gradually lowers, thereby causing the spool in the servo-valve to lower. As the spool lowers, the oil from the pump 71 is forced from the port P to the lower section of the servo-cylinder 17 via the port A. The oil in the upper section of the servo-cylinder 17 is forced to return to the reservoir 72 via the ports B and T, thereby causing the piston rod 24 of the servo-cylinder 17 to rise gradually, and enlarging the distance between the two pivots 22 and 26.

Figure 5:
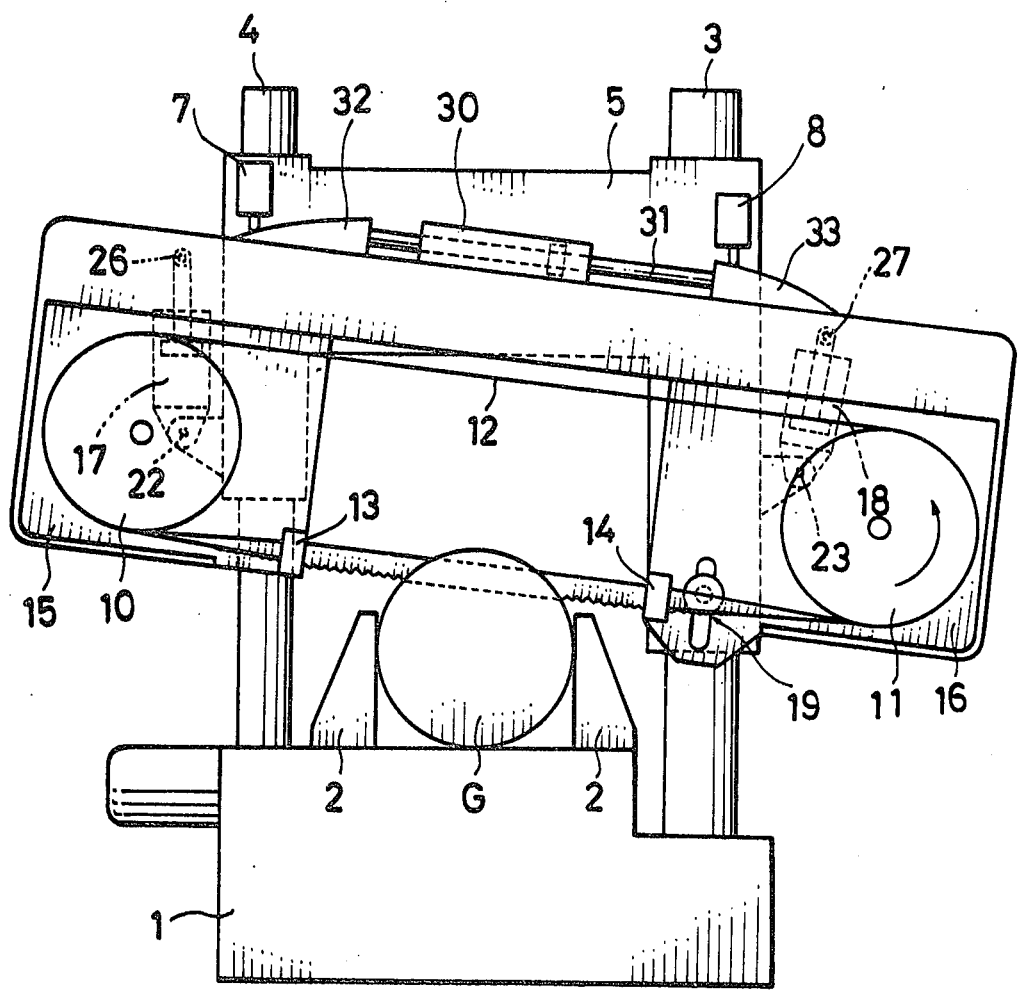
FIG. 5 is a front view of the mtal-sawing machine in operation.

On the other hand, the point of contact between the right-hand servo-valve 8 and the oblique plate 33 gradually rises, thereby causing the piston rod 25 of the right-hand servo-cylinder 18 to lower and shortening the distance between the pivots 23 and 27. Thus, the saw carrier declines rightwards as shown in FIG. 5. As the guide unit 19 is located on the line of cutting action of the saw blade or in its neighborhood, the saw carrier is prevented from any displacement likely to occur due to the weight thereof and/or the cutting resistance. In addition, there is no likelihood for the moment of force to exert an excessive force not only onto the saw blade but also onto the whole mechanism, wherein a negligible reaction to the cutting resistance unavoidably exerts in the slot 28 of the guide unit.

When the piston rod 31 of the pilot cylinder 30 is forced leftwards, thereby causing the oil in the servo-cylinder 17, 18 to flow in the reverse direction, the piston rod 24 of the left-hand servo-cylinder 17 is forced downwards, while the piston rod 25 of the right-hand servo-cylinder 18 rises. Thus the saw carrier 9 rotates in the counter-clockwise direction. In this way the saw carrier 9 rocks like a see-saw within the limit provided by the guide unit 19.

The microprocessor 41 carries out operation on the data input from the keyboard 40 with respect to the cross-sectional shape and size of the work and the heights of the guide frame, and determines the coordinates for the left-hand and right-hand turning points. It is detected and signalled when the actual positions of the piston rod 31 of the pilot cylinder 30 is in accord with the calculated turning points. When it is signalled, the microprocessor 41 orders the oblique plate to move to the right and to the left alternately, whereby the solenoids E, F are alternately switched on.

Subsequently to signalling the positional accord between the piston rod 31 of the pilot cylinder 30 and the calculated turning point, the microprocessor 41 outputs an instruction for a fixed period of time. In response to the signal the solenoid C is magnetized, thereby allowing the hydraulic feed cylinder 6 to discharge a fixed amount of oil therefrom. In this way the guide frame 5 is descended by the fixed amount when the cutting point running along the arch-like traces reaches each turning point. After the period of time expires, the descending movement is stopped until the next turning point is reached. The movement of the guide frame 5 is depicted in FIG. 9, wherein the trace is characterized by the stair-like line.

In the illustrated embodiment the rocking motion is effected by the reciprocating piston rods 31 alternately operated, but it can be effected in various ways. A crank mechanism or a reciprocating semi-circular rack arrangement can be effectively employed. In the illustrated embodiment the guide frame 5 is supported by a pair of columns 3, 4 such that it can descend and ascend along the columns, but it can be modified that the guide frame is hinged to the bed 1 at its one end such that it can move up and down.

What is claimed is:

1. A metal-sawing machine for cutting a work in a rocking motion of the saw blade, which machine comprises:
   a guide frame vertically movable with respect to a work placed on the bed;
   a vise for holding said work, said vise including a fixed jaw and a movable jaw;
   a saw carrier including a pair of saw wheels on which an endless saw blade is carried so as to run in a loop around said wheels;
   a first means for enabling said saw carrier to rock in a cutting plane in which said saw blade cuts said work;
   a second means for measuring the amount of said rocking motion of said saw carrier;
   a third means for measuring the height of said guide frame or said saw carrier;
   an input unit for inputting the shape and size of said work; and
   an arithmetic for calculating the turning points at which said saw blade turns the directions of its rocking motion, thereby ensuring that the rocking range of said saw blade changes in accordance with the shape and size of the work.

2. The metal-sawing machine as defined in claim 1, wherein said rocking means comprises:
   a pair of servo-cylinders one on the left-hand section and the other on the right-hand section of said saw carrier;
   each of said servo-cylinders being connected at its one end to said guide frame at a first pivotal point while the opposite end thereof is connected to said saw carrier at a second pivotal point;
   a rocking motion control means for alternately differentiating the distance between said first and second pivotal points of each of said servo-cylinders, thereby enabling said saw carrier to rock in the cutting plane with respect to said work held on said vise; and
   a guide means for preventing said saw carrier from horizontal displacement with respect to said work.

3. A metal-sawing machine as defined in claim 2, wherein said rocking motion control means includes a means for driving left-hand oblique plate and right-hand oblique plate to the left and right, a pair of servo-valves corresponding to said servo-cylinders, said servo-valve being adapted to control said servo-cylinder independently, said oblique plates being engaged with said servo-valves, said means for driving said oblique plates being mounted on said saw carrier while said servo-valves are mounted on said guide frame.

4. A metal-sawing machine as defined in claim 1, wherein said arithmetic means comprises a program made by solving the root of a first equation representing arch-like traces along which the cutting point is shifted, and a second equation representing the cross-sectional shape of said work, thereby calculating the turning points of said rocking motion of said saw carrier.

5. A metal-sawing machine as defined in claim 1, further comprising a control means for controlling said saw carrier to descend for a fixed period of time by a fixed distance at said each turning point.

* * * * *